Figure 4:
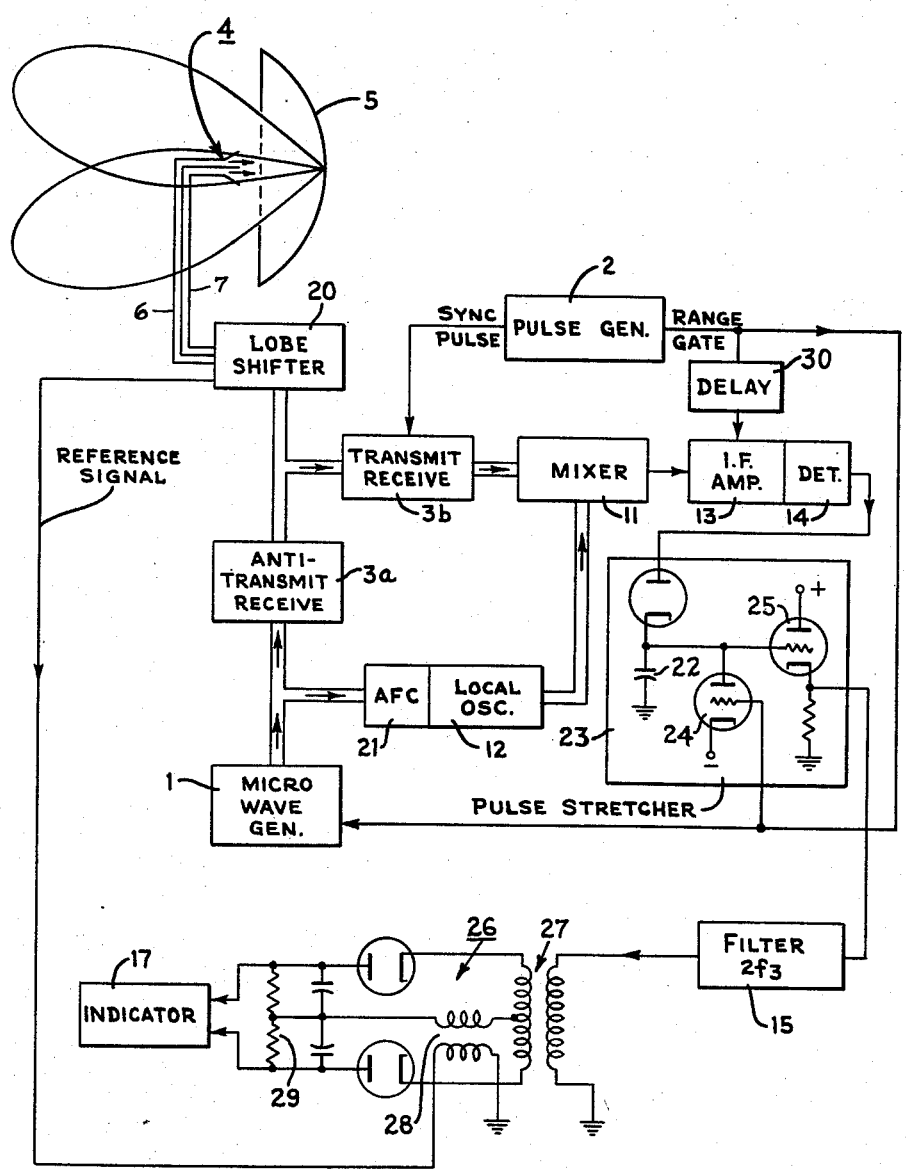

Sept. 29, 1959 C. D. McGILLEM 2,907,024
NUTATING ANTENNA RADAR
Filed March 28, 1955 2 Sheets-Sheet 1
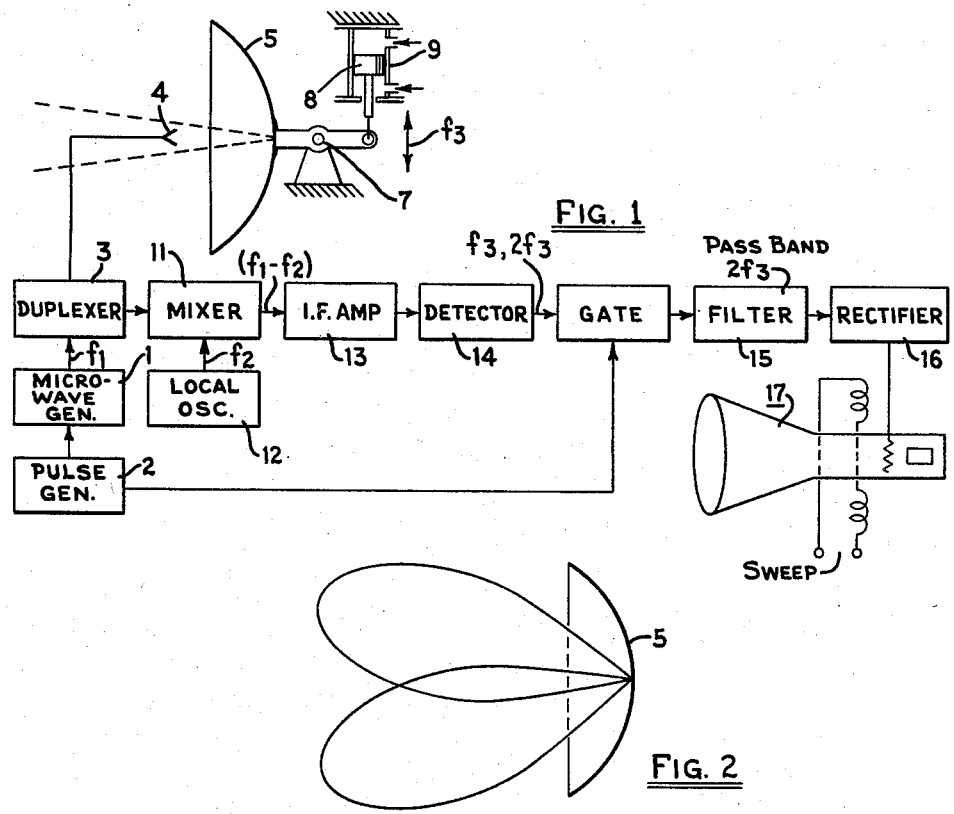
FIG. 1
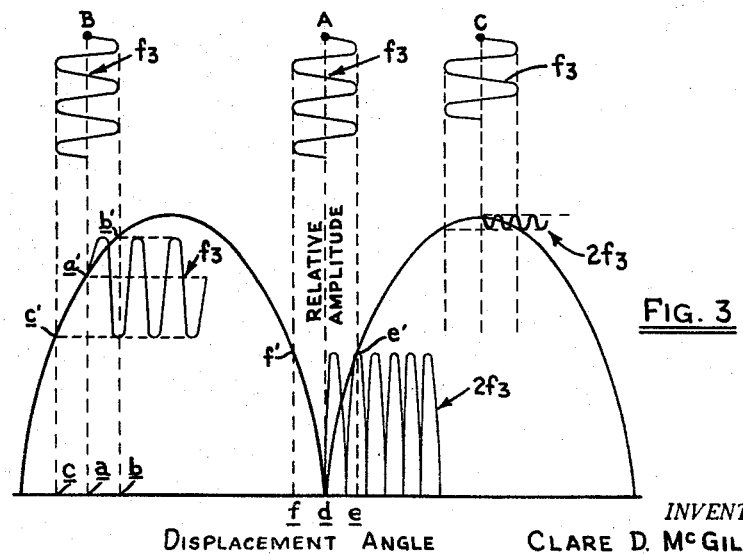
FIG. 2
FIG. 3
INVENTOR.
CLARE D. McGILLEM
BY
ATTYS.

United States Patent Office 2,907,024
Patented Sept. 29, 1959

2,907,024
NUTATING ANTENNA RADAR

Clare D. McGillem, Flint, Mich., assignor to the United States of America as represented by the Secretary of the Navy Application March 28, 1955, Serial No. 497,480

15 Claims. (Cl. 343—16)

(Granted under Title 35, U.S. Code (1952), sec. 266)

The invention described herein may be manufactured and used by or for the Government of the United States of America for governmental purposes without the payment of any royalties thereon or therefor.

My invention relates to radar and is particularly directed to means for improving the resolving power of the directional beam of the radar.

A radar system, in accordance with this invention, includes means for oscillating the radar beam at an arbitrary frequency. When a reflecting object intercepts or is close enough to the median axis of the oscillating beam, the fundamental frequency of an echo signal will be twice the beam oscillation frequency. The receiver of the radar system contains means for passing detected echo signals having twice the frequency of beam oscillation, but attenuating all other frequencies. As a result, the sensitivity of such a system to noise and random echo signals is decreased and its resolving power is increased materially. The invention may be applied advantageously, in the manner described below, to improve the resolving power of both single and multi-lobe radar systems.

The phrase "radar beam," as used herein, is intended to represent all of the energy radiated into space from an antenna notwithstanding the configuration of the beam. It is intended, therefore, that a radiation pattern comprising one or more lobes be included within the meaning of "radar beam." The phrase "beam axis" is intended to represent the axis of symmetry for beams having single and multi-lobe radiation patterns. For example, the "beam axis" of a single-lobe beam normally will coincide with a bore-sight line of the antenna and will define the locus of greatest field intensity of radiated energy in any cross section of the beam. On the other hand, the "beam axis" of a multi-lobe beam normally will be a straight line running outwardly from the antenna between the lobes and defining the path of least field intensity of radiated energy. A "lobe axis" normally will be a straight line defining the path of greatest field intensity from the antenna outwardly through the lobe. Each of the phrases "median axis," "median position," and "median line" is intended to represent the reference line where each excursion of the oscillating beam originates.

Attempts in the past to improve radar beam resolution have included the narrowing of the beam lobe as well as transmitting two different overlapping beams. In one system, the transmitter output is radiated in two lobes simultaneously and the echo pulses from the two lobes are separately received and detected. The two received signals are then subtracted one from the other, and the difference video signal is then compared with a voltage proportional to the sum of the two video signals and the resultant signal displayed on the indicator. Such a so-called monopulse system is of limited effectiveness because its ability to discriminate between two or more targets that are aligned or nearly aligned on the beam axis is dependent upon the phase of the signals returned by the targets. Since, under most operating conditions, this phase will be random, the resulting target discrimination will be erratic. In fact, under certain circumstances, false targets can be generated and shown on the indicator.

An object of my invention is a radar system for improving the angular resolution of the directional beam of radar.

A more specific object of my invention is a radar system which is free of the difficulties of phase differentiation between signals from targets on or closely adjacent to the axis of a multi-lobe radar beam.

Other objects of my invention will become apparent in the following description of preferred embodiments of the invention, which are defined in the appended claims and are illustrated in the acompanying drawings in which:

Fig. 1 is a schematic diagram of my invention embodied in a radar system for transmitting a single-lobe beam.

Fig. 2 is a diagram showing the transmit-receive beam pattern of a radar system for transmitting a two-lobe beam, Fig. 3 is a polar plot of the strength of radar signals reflected from targets both on and off the axis of a two-lobe beam, and Fig. 4 is a schematic diagram of a radar system for transmitting a two-lobe beam embodying my invention, including apparatus for range gating, pulse stretching, and phase detection.

Referring first to Fig. 1, a radar transmitter comprising a microwave generator 1 is pulsed by pulse generator 2. The resulting pulses of microwave energy are fed through the duplexer 3 to the radiating antenna 4 placed at or near the focal point of parabolic reflector 5. The duplexer 3 may be any one of a number of prior art devices including a transmit-receive valve for, on the one hand, conveying the generated energy to the antenna with a minimum of energy to the receiver, and on the other hand conveying the reflected or echo energy from the antenna through the duplexer to the receiver with minimum attenuation by the generator. A generator producing pulses having high frequency and high power normally comprises a magnetron.

The transmission line between the generator, duplexer, and the antenna may be of the open parallel wire, coaxial cable, or waveguide types.

It is contemplated, according to an important feature of my invention, that the beam radiated from antenna 5 oscillate or nutate through a small angular distance about a median axis. To facilitate understanding, mechanical rather than electrical means to nutate the beam will first be described. The reflector 5, pivotally supported upon pin 7, is oscillated through a small angle by the piston 8 of the hydraulic cylinder 9. The oscillation frequency $f_3$ of the reflector and, hence, the beam radiated therefrom may be, for example, 100 excursions per second. Alternatively, the mechanical drive for the reflector could be any suitable vibrator of sufficient power to oscillate the reflector at frequency $f_3$, consideration being given to the moments of inertia of the moving parts. The reflector, of course, could be held stationary and the antenna 4 oscillated. A still further, and preferred, alternative is to oscillate the beam electrically by well known beam shifting circuits. Furthermore two antennas could be fixed near to but displaced slightly from the centerline of the reflector and fed through separate waveguides from the transmitter. A suitable switch may be utilized to couple each of the two antennas to the microwave source.

Each pulse of reflected microwave energy received from a distant target is fed to the mixer 11 where it is beat in conventional heterodyne fashion with the output of a local microwave oscillator 12. The mixer 11 is preferably of the usual crystal detector type employed in radar receivers. The intermediate frequency output of the mixer is then amplified in amplifier 13 and detected in detector 14. As will appear hereinafter and according to an important feature of my invention, the output of detector 14 will be pulses which are amplitude modulated at either of two frequencies corresponding, respectively, to the nutation frequency, $f_3'$ of the beam or to twice the nutation frequency, $2f_3$. For reasons to be explained hereinafter, the frequency $2f_3$ will be produced only when the median axis of the beam intercepts or approaches near to the target. The output pulses from the detector 14 are then applied to the filter 15 which is of the narrow pass type tuned to attenuate all frequencies except $2f_3$. The $2f_3$ pulses at the output of filter 15 are rectified at 16 and applied to an indicator 17 which, in Fig. 1, comprises a cathode ray tube with its control grid coupled directly to the output of rectifier 16.

Although Figure 3 is a polar plot of the strength of radar signals reflected from targets both on and off the median axis of a two-lobe beam, it is nonetheless helpful in explaining the basic principles of the invention as embodied in the radar system represented in Fig. 1. Assume that the portion of Fig. 3 to the left of the dotted line through points $f$ and $f'$ represent the signals generated in a radar system transmitting, in accordance with the invention, an oscillating single-lobe beam which intercepts a target at position B, and that the portion of Fig. 3 to the right of the dotted line through $e$ and $e'$ represents the signals in the same system when a target is at position C. Although the target positions B and C are represented as oscillating at the beam oscillation frequency $f_3$ by vertically oriented sine waves having dotted lines through points B and C as their respective axes, it should be understood that it is the single-lobe beam which oscillates, not the target positions. The target positions are represented as oscillating merely to avoid confusing overcomplication of the drawing.

Consider first the left-hand portion of Fig. 3. The target B is located to the left of the median axis of the single-lobe beam. As represented by the curve segment $c'$—$b'$, the field intensity of the single-lobe radar beam varies considerably between the limits $c$—$b$ of target-position oscillation. Thus, during the first half cycle of a complete oscillation of target position B, the amplitude of pulses reflected from the target increases by an amount represented by the extent to which the distance of point $b'$ above the base line exceeds that of $a'$. During the second half cycle of a complete oscillation, the amplitude of echo pulses returned from the target decreases by an amount represented by the difference in the respective heights above the base line of points $a'$ and $c'$. Accordingly, the fluctuation in the amplitude of the returning signals occurs at a frequency equal to the frequency of beam oscillation $f_3$. This variation in pulse amplitude is represented by the horizontally-oriented sine wave beginning at point $a'$.

Now, consider the right-hand portion of Fig. 3. The target position C is oscillating around the median axis of the single-lobe beam. Accordingly, each complete cycle of oscillation of the target position C produces two decreases in the amplitude of the reflected echo pulses such that the resulting frequency of amplitude fluctuation is twice the frequency of beam oscillation, $2f_3$.

Inasmuch as the receiving circuits of the radar system represented in Fig. 1 contain the narrow bandpass filter 15 which selectively passes frequencies, $2f_3$, approximating twice the frequency of beam oscillation, and attenuates all other frequencies, it should be apparent that the resolution of reflecting objects within the angle generated by the axis of the oscillating beam will be materially increased. In the embodiment of Fig. 1, detected pulses having amplitude-modulation frequencies substantially equal to $2f_3$ pass from the filter 15 to rectifier 16 where they are smoothed into a direct current potential before application to the control grid of information display tube 17.

The embodiment of the invention represented in Fig. 4 comprises a radar system for transmitting a two-lobe beam, including apparatus for range gating, pulse stretching and phase detection. The microwave generator 1 is pulsed by pulse generator 2 and delivers its output through the anti-transmit-receive device 3a to the lobe shifter 20 and hence to antenna 4 through two waveguides 6 and 7. The two horns of antenna 4 are displaced slightly on either side of the median line of the reflector 5 to produce two angularly displaced lobes. The lobe shifter 20 may be any conventional shifter of the mechanical or electrical type for simultaneously oscillating the lobes emerging from the two horns of antenna 4. Further, shifting may be in steps or may be sinusoidal, to either displace the lobes stepwise to their various positions or nutate them smoothly. Signals received via reflector 5 and antenna 4 are fed through the transmit-receive device 3b to the mixer 11 where they are mixed with the output of local oscillator 12 controlled in frequency by the automatic frequency control circuitry 21.

The intermediate frequency output of mixer 11 is amplified in amplifier 13, one or more stages of which may, if desired, be gated on and off by a coupling to the output of the pulse generator 2. Such a gate should have means for adjusting intervals between gate opening times in order to exclude all echo signals received and detected except those representative of a desired range. Preferably, the detected signals are integrated in the condenser 22 of the pulse stretcher 23, the condenser being discharged periodically immediately preceding the range gate signal by the triode 24, the control grid of which is coupled to the pulse generator 2. So that the condenser 22 can be discharged to a fixed level of charge before the reception of the next succeeding pulse, a delay circuit 30 is inserted between the pulse generator 2 and the amplifier 13 of the receiver. A very small delay is all that is required to prevent interaction between two adjacent pulses. The stretched pulses obtained at the condenser 22 are amplified in the cathode follower 25 and fed into bandpass filter 15. As in Fig. 1, the bandpass filter passes only frequencies of twice the beam oscillation frequency $f_3$.

Before applying pulses having amplified modulation frequencies equal to $2f_3$ to the indicator 17 they are, according to an important feature of this invention, compared in phase with a voltage which is synchronized with the beam oscillation. The particular phase sensitive detector shown at 26 comprises two rectifiers in two arms of a bridge, in the complementary arms of which are the two halves of the secondary windings of the coupling transformer 27. The reference frequency signal from the lobe shifter 20 is coupled into one diagonal of the bridge by transformer 28. The output of the bridge, developed across resistor 29, is applied directly to the indicator 17.

The operation of the embodiment of Fig. 4 will be explained with reference to Fig. 3. The angle of displacement of the two-lobe beam from its median position at point $d$ is represented along the base line of the figure. The relative amplitude of the signal reflected from objects intercepted by each lobe of the beam is plotted for angles of displacement on either side of the median axis. It is assumed, of course, that the gain of the amplifiers, filters, and coupling circuits of the radar systems in both Fig. 1 and Fig. 4 is constant. Signals reflected from targets at positions B and C will produce signals at the filter 15 of the same frequency and in the same manner as those represented in Fig. 3 and explained above in connection with the operation of the embodiment of Fig. 1. It should be understood, however, that the beam produced by a radar system such as that shown in Fig. 4 will have two lobes and, as a result, targets B and C of Fig. 3 are intended to represent separate targets intercepted by separate lobes of the beam, and the signals produced at filter 15 by pulses reflected from targets B and C will occur simultaneously.

Now, assume that target A is located along the median axis of oscillation extending vertically through point $d$. As the beam axis oscillates through an angle subtended by positions $e$ and $f$ it will be observed that the amplitudes of echo pulses rise to two equi-directional maxima, $e'$ and $f'$, for each complete oscillation of the beam. Accordingly, the frequency of the output signal from the detector 14 necessarily must be equivalent to twice the beam oscillation frequency; that is, $2f_3$, a signal frequency which is passed through bandpass filter 15 with little or no attenuation, rectified at 16, and made perceptible by indicator 17.

It should be apparent that a target at C, Fig. 3, will produce a spurious or unwanted frequency $2f_3$ at the ouput of bandpass filter 15. Since the target at C will produce in the output of detector 14 a frequency of $2f_3$ it must be eliminated to prevent confusion on the indicator with the target at position A. Fortunately, the phase of the undesired $2f_3$ signal is opposite to the phase of the desired $2f_3$ signal. When such an out-of-phase signal is applied at transformer 27 and added to the reference signal from the lobe shifter 20 there results at the output 29 a direct current indicator voltage of a sign opposite to the sign of the signal produced by the desired radar signal from target A. Such a negative polarity signal will not activate the indicator.

The angular resolution of the directional beam of the radar of this invention is not only improved, but the spurious signals of closely adjacent targets are positively differentiated against and eliminated from the indicator.

Many modifications may be made in the components of the circuits of Figs. 1 and 4 without departing from the scope of the appended claims.

What is claimed is:

1. A radar system having an antenna for radiating a beam of microwave energy, a transmitter and receiver coupled to the antenna, means for nutating the beam to either side of the median position of the beam at a predetermined frequency ($f_3$), a filter coupled to the output of the receiver, said filter being adapted to pass a limited band of fundamental frequencies approximately centered at a frequency equal to twice said predetermined frequency ($2f_3$), and a utilization circuit coupled to the output of said filter.

2. A radar system comprising a pulsed transmitter, a receiver, and a directional antenna operatively coupled together, and including means to nutate the beam of the antenna about a median line of the antenna; said receiver including a filter adapted to selectively pass fundamental frequencies of twice the nutation frequency, and a utilization circuit coupled to the output of the filter.

3. A radar system comprising a microwave generator, a pulse source controlling said generator, an antenna for radiating a microwave beam coupled to the generator, means for nutating the beam at a predetermined frequency ($f_3$), means coupled to the said nutating means for producing a voltage in phase with the beam nutations, pulse detecting means coupled to the antenna, a pulse stretching circuit coupled to the said detecting means, the said pulse-stretching circuit having a condenser chargeable by the detected pulses and a discharge circuit responsive to said pulse source; and means coupled between the said in-phase-voltage producing means and the said pulse-stretching circuit for developing an output signal representative of the phase relationship between the said in-phase voltage and stretched pulses from the said pulse-stretching circuit, the said output signal having a fundamental frequency approximating twice the said predetermined frequency ($f_3$), the said output-signal developing means including a bandpass filter for passing pulses from the said pulse-stretching circuit having the aforesaid fundamental frequency with less attenuation than pulses having other frequencies.

4. In a radar system, a lobe shifter means for nutating the radar beam, means for detecting echo pulses, a filter adapted to pass only fundamental frequencies substantially equal to twice the nutation frequency, a phase sensitive detector coupled to said filter and to said lobe switching means for selecting signals at the output of the filter of predetermined phase value.

5. In a radar system, a directional antenna, means for nutating the beam of the antenna and means for producing an undulating voltage analogous to and synchronized with the nutations of the beam, means for detecting pulse signals received by said antenna, means coupled to the said detecting means for passing detected pulses having a fundamental repetition frequency approximating twice the frequency of the said undulating voltage and for attenuating other frequencies, and means coupled to the last-named means and to the said undulating voltage producing means for comparing the phase of the detected signals with the phase of said undulating voltage.

6. A radar system comprising a directional antenna, means for oscillating the beam of the antenna about the median line of the antenna, a reference voltage source coupled to and synchronized with the beam oscillating means, a pulse receiving system coupled to the antenna with a gate for passing only pulses corresponding to a predetermined range of antenna to target, a pulse stretcher coupled to the output of the receiving system, a filter responsive only to received pulses having a fundamental frequency substantially equal to twice the frequency of the said reference voltage source coupled to the output of said pulse stretcher, a phase detector coupled to the output of the said filter and to said reference voltage source, and an indicator coupled to said phase sensitive detector.

7. A radar system comprising: means generating microwave energy; means coupled to the said microwave generating means for directing a beam of microwave energy into space; means for oscillating said beam through a median axis; means for receiving microwave-energy signals returned from reflecting objects in the said beam, the said receiving means including means for producing a usable output signal representative of fundamental frequencies of the said reflected microwave-energy signals approximating twice the frequency of beam oscillation; and a utilization circuit responsive to the said usable output signal.

8. In a radar system having means for directing a beam of microwave energy into space, means for detecting energy returned from reflecting objects intercepted by the said beam, and means for rendering perceptible information derived from the returned energy, resolution-intensification apparatus for increasing the ability of the radar system to discriminate between reflecting objects on and close to the median axis of the said beam comprising: means oscillating the said beam through the said median axis thereby producing during each complete cycle of oscillation two equi-directional fluctuations in the amplitude of energy returned from reflecting objects on and close by the said median axis relative to the amplitude of energy returned from the said objects at instants when the beam axis is closest to the said median axis; and means selectively responsive to returned energy having the aforesaid two equi-directional fluctuations per cycle of beam oscillation coupled between the said detecting means and the said rendering means.

9. In a radar system as represented in claim 8, a resolution-intensification apparatus wherein the said selectively-responsive means comprises a bandpass filter.

10. In a radar system as represented in claim 8, a resolution-intensification apparatus further comprising means coupled to the said beam-oscillating means for developing a reference voltage wave; and means coupled to the said reference-voltage developing means, the said selectively-responsive means, and the said rendering means for preventing any spurious signals otherwise passed by the said selectively-responsive means from affecting the said rendering means.

11. In a radar system as represented in claim 10, resolution-intensification apparatus wherein the said spurious-signal preventing means comprises a phase-sensitive detector.

12. An improved monopulse radar system including apparatus for resolving between reflecting objects on and spaced closely to the axis of the radar beam comprising: a radar transmitter for transmitting pulses of microwave energy in a beam; means coupled to the said transmitter for radiating the said beam of microwave-energy pulses into space in two simultaneous, overlapping lobes, whereby the field through a cross section of the said beam has intensity maxima along the axes of the said lobes and an intensity minimum along the median axis of the said beam; means coupled to the said radiating means for oscillating the said beam such that microwave energy returned from reflecting objects within the angle generated by the median axis of the oscillating beam will have two amplitude maxima per cycle of oscillation, energy returned from reflecting objects within the angle generated by the axis of each of the said lobes will have two amplitude minima per cycle of oscillation, and energy returned from reflecting objects elsewhere within the beam will have only one maximum amplitude and one minimum amplitude per cycle of operation; means including detecting means for receiving microwave energy returned from reflected objects intercepted by the said beam; means coupled to the said detecting means selectively passing detected signals representative of reflecting objects within the angles generated by the respective axes of the said beam and the said lobes, the said signals thereby having fundamental frequencies approximating twice the frequency of the said oscillating means; and means coupled to the said signal-selective passing means for transducing the object-representative signals into perceptible form.

13. An improved monopulse system as represented in claim 12 further comprising: means coupled to the said beam oscillating means for generating a reference wave of voltage; and means coupled to the said reference-voltage generating means and to the said signal-selective passing means for nullifying the effect on said transducing means of energy returned from reflecting objects within the angles generated by the axes of the said lobes during oscillation of the radar beam.

14. An improved monopulse radar system as represented in claim 13 wherein the said means for nullifying comprises a phase-sensitive rectifier.

15. In an improved monopulse radar system, means radiating a two-lobe monopulse radar beam into space; means causing the said radar beam to oscillate such that reflecting objects within the angle generated by the median axis of the said beam will return first pulse signals having amplitude variations occurring at twice the frequency of beam oscillation, reflecting objects within the angle generated by the axis of each of the said two lobes will return second pulse signals having a frequency of amplitude variation opposite in phase but equal in frequency to the said first pulse signals, and reflecting objects located elsewhere in the said beam will return third pulse signals having frequencies of amplitude variation equal to the frequency of beam oscillation; and means selectively responsive to the amplitude variations of the said first pulse signals for transducing the said first pulse signals into perceptible form.

References Cited in the file of this patent

UNITED STATES PATENTS

| | | |
|---|---|---|
| 2,480,171 | White | Aug. 30, 1949 |
| 2,638,585 | Priest | May 12, 1953 |